(12) United States Patent
Stocks et al.

(10) Patent No.: US 8,379,732 B2
(45) Date of Patent: Feb. 19, 2013

(54) COMMUNICATIONS DEVICE FOR SCANNING MULTIPLE FREQUENCIES AND FOR DETECTING ANALOG AND DIGITAL VIDEO SIGNALS AND ASSOCIATED METHODS

(75) Inventors: Nicholas J. Stocks, Rochester, NY (US); Brian C. Padalino, Rochester, NY (US); Cory N. Fitzsimmons, Avon, NY (US)

(73) Assignee: Harris Corporation, Melbourne, FL (US)

( * ) Notice: Subject to any disclaimer, the term of this patent is extended or adjusted under 35 U.S.C. 154(b) by 316 days.

(21) Appl. No.: 12/779,505

(22) Filed: May 13, 2010

(65) Prior Publication Data

US 2011/0280313 A1 Nov. 17, 2011

(51) Int. Cl.
*H04N 7/12* (2006.01)
(52) U.S. Cl. .................................. 375/240.25
(58) Field of Classification Search ............. 375/240.25, 375/321
See application file for complete search history.

(56) References Cited

U.S. PATENT DOCUMENTS

| | | | | |
|---|---|---|---|---|
| 7,322,039 B2 | 1/2008 | Tsubouchi et al. | ........... | 725/151 |
| 7,468,762 B2 | 12/2008 | Ishihara et al. | ............... | 348/732 |
| 2002/0066114 A1* | 5/2002 | Onomatsu | ...................... | 725/151 |
| 2002/0097344 A1 | 7/2002 | Shibusawa | ..................... | 348/731 |
| 2003/0151698 A1* | 8/2003 | Ishihara et al. | ............... | 348/723 |
| 2004/0036811 A1 | 2/2004 | Ikeguchi | ........................ | 348/732 |
| 2008/0018790 A1* | 1/2008 | Wong et al. | ................... | 348/558 |
| 2008/0022335 A1* | 1/2008 | Yousef | .......................... | 725/100 |
| 2008/0160973 A1* | 7/2008 | Ben-Hamo | ................ | 455/414.2 |
| 2008/0304596 A1* | 12/2008 | Tan et al. | ....................... | 375/321 |
| 2009/0122205 A1 | 5/2009 | Xing et al. | .................... | 348/732 |

FOREIGN PATENT DOCUMENTS

WO 2009/018766 2/2009

* cited by examiner

*Primary Examiner* — Anner Holder
(74) *Attorney, Agent, or Firm* — Allen, Dyer, Doppelt, Milbrath & Gilchrist, P.A.

(57) ABSTRACT

A communications device includes a radio frequency (RF) receiver being scannable over a plurality of different frequencies and an analog to digital (AD) converter coupled to the RF receiver. The AD converter is configured to generate a receive bitstream. A processor coupled to the RF receiver and the AD converter. The processor is configured to perform, in parallel, calculating a received power level from the receive bitstream, attempting analog video decoding from the receive bitstream, and attempting digital video decoding from the receive bitstream. The processor is also configured to lock the RF receiver to a current frequency or scan the RF receiver to a next frequency based upon the received power level, and the attempted analog and video decoding.

20 Claims, 3 Drawing Sheets

COMMUNICATIONS DEVICE FOR SCANNING MULTIPLE FREQUENCIES AND FOR DETECTING ANALOG AND DIGITAL VIDEO SIGNALS AND ASSOCIATED METHODS

FIELD OF THE INVENTION

The present invention relates to the field of wireless video communications, and, more particularly, to a radio frequency (RF) communications device for differentiating RF analog video communications from RF digital video communications and related methods.

BACKGROUND OF THE INVENTION

RF transmission of video signals is commonly performed for certain applications. For example, television stations routinely broadcast such video signals on a variety of frequency bands, which may then be received and displayed by television sets. Furthermore, unmanned surveillance aircraft used for crowd observation also broadcast video signals on a variety of frequency bands. Tuning a receiver to a known frequency to receive a video signal transmitted on that frequency is quick and simple. However, when no specific frequency is known, and instead merely a band of frequencies, tuning a receiver to find a video signal being transmitted at a given frequency within the band of frequencies can be time consuming, as each frequency within the band may be checked.

To add to this difficulty of finding a given frequency on which the video signal is being transmitted, the video signal may be an analog or a digital video signal. Therefore, when both the form (analog or digital) of the video signal and the given frequency on which it is being transmitted are unknown, a separate analog and a separate digital receiver are typically used to find the video signal. Each receiver is made to scan each frequency of the band. As such, detection of a video signal with an unknown form and being transmitted on an unknown frequency can be time consuming for even advanced hardware.

Attempts at making receivers to speed up this process have been made. For example, U.S. Pat. Pub. 2009/0122205 to Xing et al. discloses a television receiver including separate analog and digital video tuners. Each tuner is configured to separately scan a plurality of channels for a video signal. An analog decoder determines whether the analog video tuner has found a video signal on a given channel, while a digital decoder determines whether the digital video tuner has found a video signal on the given channel. The television receiver of Xing et al., however, suffers from some drawbacks. For example, both the analog and the digital tuner check each channel for the presence of a video signal, even though one of the tuners may have determined that there is no signal on a given channel.

U.S. Pat. No. 7,322,039 to Tsubouchi et al. discloses a broadcasting receiver for receiving analog and digital video signals. The broadcasting receiver includes an analog tuner and a digital tuner. The analog tuner and the digital tuner are configured to concurrently scan a plurality of channels for video signals. A main CPU determines whether the digital tuner has found a digital video signal, while a sub-CPU determines whether the analog tuner has found an analog video signal. Tsubouchi et al. suffers from similar drawbacks to Xing et al., however. Both the analog and the digital tuner check each channel for the presence of a video signal, even though one of the tuners may have determined that there is no signal on a given channel.

Given the drawbacks of the prior art, further advances in communications devices able to scan a range of frequencies for analog and digital video signals may be desirable.

SUMMARY OF THE INVENTION

In view of the foregoing background, it is therefore an object of the present invention to provide a communications device able to quickly scan a range of frequencies for a video signal and determine if the video signal is an analog video signal or a digital video signal.

This and other objects, features, and advantages in accordance with the present invention are provided by a communications device comprising a radio frequency (RF) receiver being scannable over a plurality of different frequencies. An analog to digital (AD) converter is coupled to the RF receiver and is configured to generate a receive bitstream. A processor is coupled to the RF receiver and the AD converter. The processor is configured to perform in parallel calculating a received power level from the receive bitstream, attempting analog video decoding from the receive bitstream, and attempting digital video decoding from the receive bitstream. The processor is also configured to lock the RF receiver to a current frequency or scan the RF receiver to a next frequency based upon the received power level, and the attempted analog and video decoding. The processor may scan the RF receiver to a next frequency based upon the received power level being below a threshold.

By calculating the received power level, attempting analog decoding, and attempting digital decoding in parallel, the process of scanning a given frequency range for video signals is significantly sped up. For example, determining the received power level is very quick. Therefore, before attempted analog or digital decoding can be completed, the calculation of a received power level of a given frequency will be complete. If the received power level is below a threshold, the processor scans the RF receiver to a next frequency, saving time, as continuing the attempted analog and digital detection would be fruitless.

In addition, the processor may also scan the RF receiver to a next frequency based upon the received power level being above a threshold, and based upon a failure of attempted analog and video decoding. Furthermore, the processor may lock the RF receiver to a current frequency based upon the received power level being above a threshold, and based upon a success of one of attempted analog and digital video decoding.

The processor may also be configured to perform a frequency offset calculation (e.g. a DC offset calculation) and to perform a fine tuning of the RF receiver based upon the frequency offset calculation. This fine tuning allows the processor to quickly scan the RF receiver to the proper frequency on which to receive the video signal, saving time over conventional communications devices which would scan all frequencies within a frequency band to find the proper frequency.

In some applications, the processor may comprise a field programmable gate array (FPGA) and a digital signal processor (DSP) coupled thereto. The FPGA may be configured to perform, in parallel, the calculation of the received power level, the attempted analog video decoding, and the attempted digital video decoding. The DSP may be configured to lock the RF receiver to the current frequency or scan the RF receiver to the next frequency.

The analog video decoding may comprise a frequency modulated National Television System Committee (FM NTSC) decoding. In addition, the digital video decoding may comprise a frequency-shift keying (FSK) video decoding. A multiband antenna may be coupled to the RF receiver.

A method aspect is directed to a method of operating a communications device. The method may include generating a receive bitstream using an analog to digital (AD) converter coupled to a radio frequency (RF) receiver. The method may also include performing in parallel, using a processor coupled to the AD converter and the RF receiver, a calculation of a received power level from the receive bitstream, an attempted analog video decoding of the receive bitstream, and an attempted digital video decoding of the receive bitstream. In addition, the method may include locking the RF receiver to a current frequency or scanning the RF receiver to a next frequency based upon the received power level, and the attempted analog and video decoding, using the processor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
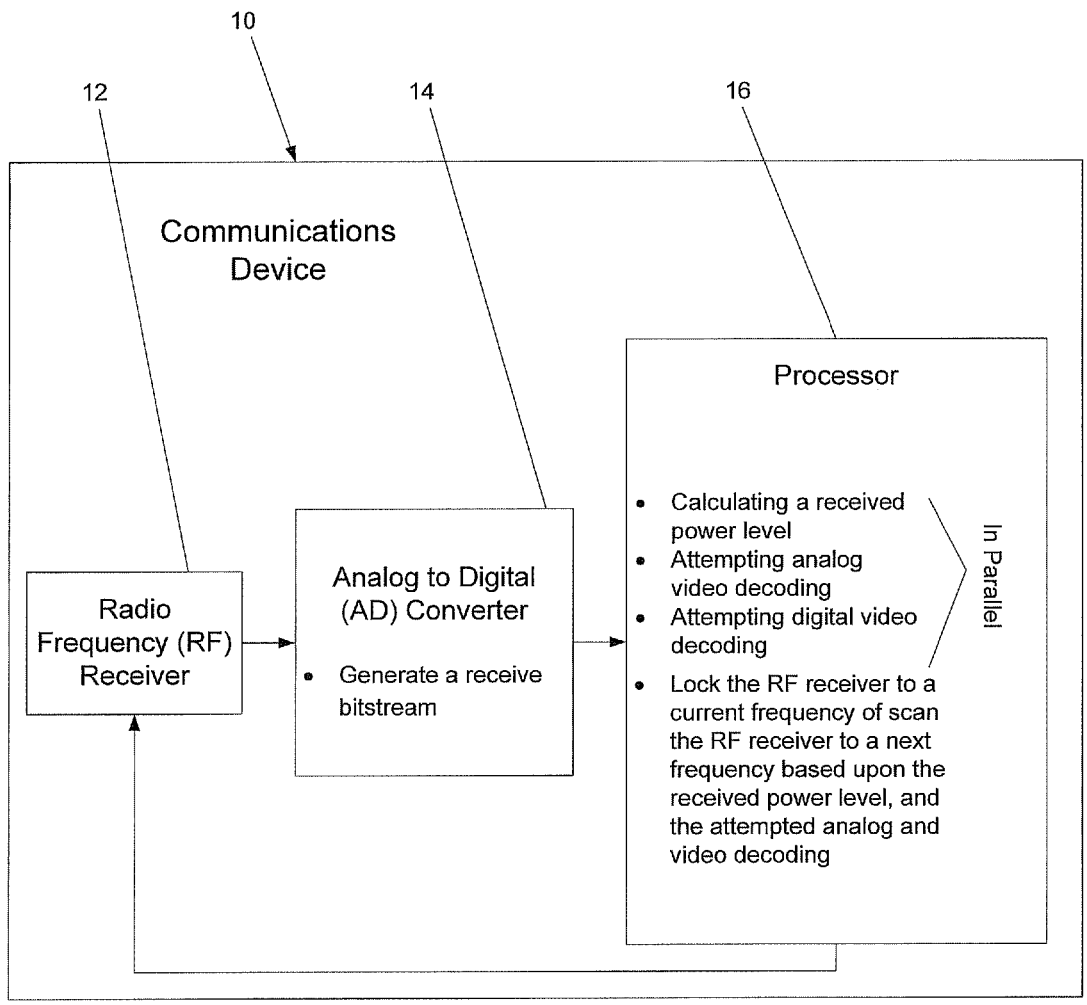
FIG. 1 is a schematic block diagram of a communications device in accordance with the present invention.

Referring initially to FIG. 1, a communications device 10 is now generally described. More specific details will be given below. The communications device 10 includes a radio frequency (RF) receiver 12 that is scannable over a plurality of different frequencies. The RF receiver 12 is coupled to an analog to digital (AD) converter 14. The AD converter 14 is configured to generate a receive bitstream based upon the RF signal received by the RF receiver. A processor 10 is coupled to the AD converter 14 and the RF receiver 12, and is capable of performing multiple operations in parallel. The processor 10, in parallel, calculates a received power level from the receive bitstream, attempts analog video decoding from the receive bitstream, and attempts digital video decoding from the receive bitstream. It should be noted that the single AD converter 14 feeds the processor 10, which then performs the above operations in parallel. This advantageously increases performance over a prior art system that would use three separate AD converters in parallel.

The processor also scans the RF receiver 12 to a next frequency based upon the received power level, and locks the RF receiver 12 to a current frequency based on the attempted analog and video decoding.

Figure 2:
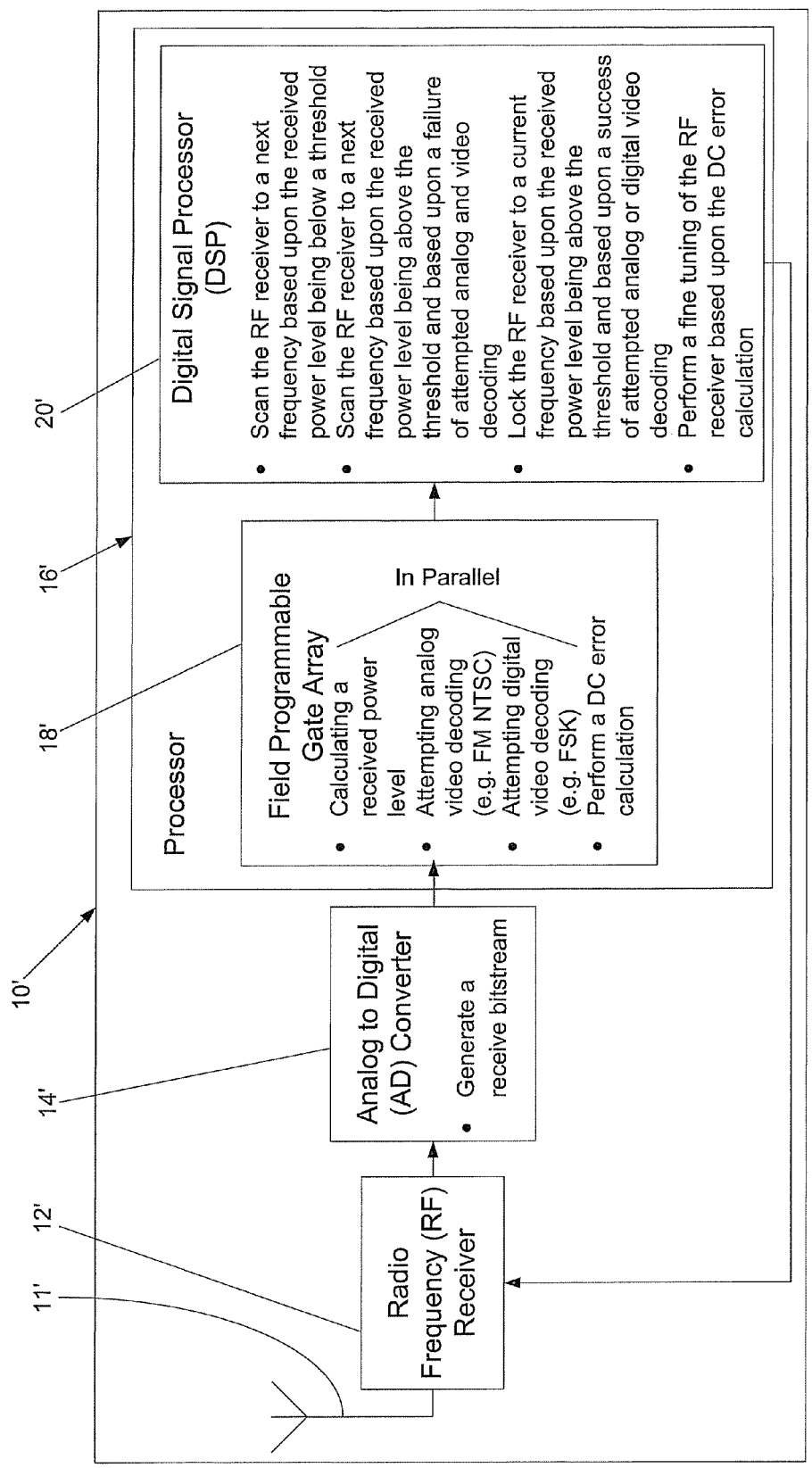
FIG. 2 is a more detailed schematic block diagram of the communications device of FIG. 1.

Referring now to the communications device 10' of FIG. 2 a more detailed description of the communications device is now given. The communications device 10' includes an RF receiver 12' with a multiband antenna 11' coupled thereto. The multiband antenna 11' may be capable of scanning the L (1.7-1.85 GHz), S (2.2-2.5 GHz), and C (4.4-5.8 GHz) bands, although it additionally or alternatively it may be capable of scanning other bands. The RF receiver 12' is scannable over a plurality of frequencies and frequency bands, and may process an incoming signal, for example converting it to a baseband signal, as will be appreciated by those of skill in the art. A single AD converter 14' is coupled to the RF receiver 12'. A processor 16' is coupled to the single AD converter 14' and the RF receiver 12', and comprises a field programmable gate array (FPGA) 18' coupled to a digital signal processor (DSP) 20'. The DSP 20' controls which frequency the RF receiver 12' scans at. It should be understood, though, that in some embodiments, the processor 12' may comprise a single central processing unit, and may not include a FPGA 18'.

The FPGA 18' includes at least three parallel logic paths. The first logic path includes logic circuitry configured to calculate a received power level of the receive bitstream. The second logic path includes logic circuitry configured to attempt analog video decoding of the receive bitstream, and the third logic path includes logic circuitry configured to attempt digital video decoding of the receive bitstream.

Figure 3:
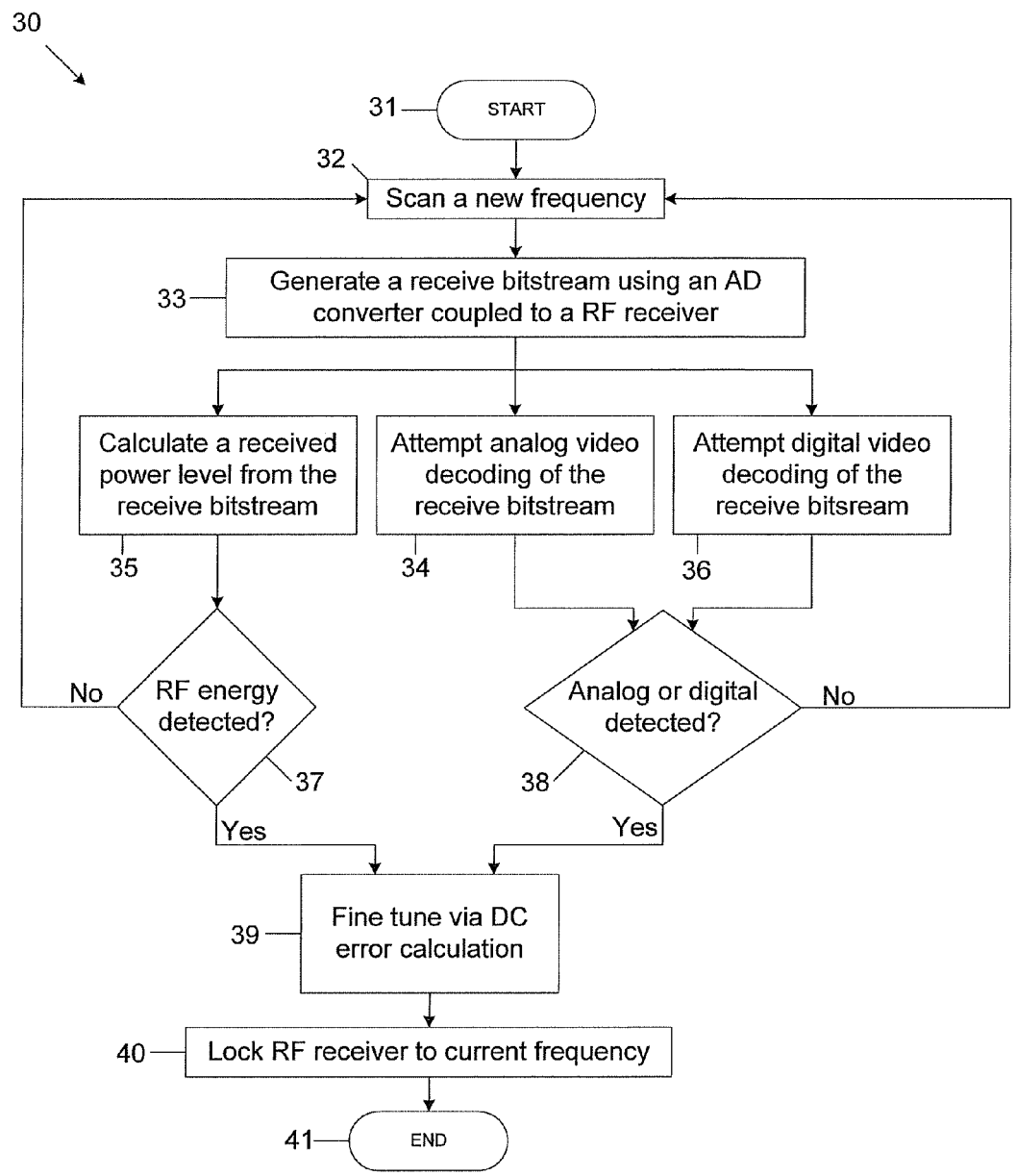
FIG. 3 is a flowchart illustrating operation of the communications device of FIG. 2.

Referring additionally to the flowchart 30 of FIG. 3, operation of the communications device 10' is now described. After the start (Block 31), the communications RF receiver 12' scans a frequency (Block 32). The single AD converter 14' then generates a receive bitstream based upon the RF signal received by the RF receiver 12' (Block 33). The bitsream is a digital representation of the incoming signal as passed to the single AD converter 14' by the RF receiver 12'. Once again, it should be noted that a single AD converter 14' passes a signal along to the FPGA 18', and not multiple AD converters working in parallel.

Next, the FPGA 18', in parallel, calculates a received power level from the receive bitstream (Block 35), attempts analog video decoding of the receive bitstream (Block 34), and attempts digital video decoding of the receive bitstream (Block 36). By "in parallel," it should be understood that the FPGA 18' performs these functions simultaneously, via separate logic paths.

Calculation of the received power level may include calculating an average power of the receive bitstream, for example, although other calculations may additionally or alternatively be performed. The attempted analog video decoding may be a frequency modulated National Television Service Committee (FM NTSC) decoding, for example, although other types of analog video decoding may be used as well. The attempted digital video decoding may be a frequency-shift keying (FSK) video decoding, although other types of digital video decoding may of course be used.

The output of each logic path of the FPGA 18' is fed to the DSP 20'. As such, the DSP 20' receives the output of each logic path as soon as the receive bitstream propagates therethrough. The DSP 20' compares the received power level with a threshold to determine whether a RF signal has been detected (Block 37). If the received power level is less than the threshold, the DSP 20' scans the RF receiver 12' to a next frequency (Block 32). After determining whether a RF signal has been detected, if the DSP 20' receives an unsuccessful analog video decoding determination and unsuccessful digital video decoding (Block 38) determination from the FPGA 18', it scans the RF receiver to a next frequency (Block 32) and the process begins anew, repeating until a video signal has been found.

By calculating the received power level, attempting analog decoding, and attempting digital decoding in parallel, the process of scanning a given frequency range for video signals is significantly sped up. For example, determining the received power level is very quick. Therefore, before attempted analog or digital decoding can be completed, the calculation of a received power level of a given frequency will be complete. If the received power level is below a threshold, the processor scans the RF receiver to a next frequency, saving time, as continuing the attempted analog and digital detection would be fruitless.

In general, a video signal may be detected on frequencies up to 2 MHz greater than, and up to 2 MHz less than, a carrier frequency of the video signal. For this reason, the DSP 20' increments the frequency at which the RF receiver 12' scans by 4 MHz when the receiver power level is less than the threshold, or when no analog or video signals are detected.

If the DSP 20' receives a successful analog video decoding of the receive bitstream or a successful digital video decoding of the receive bitstream (Block 37), it performs a fine tuning of the current frequency via a frequency offset calculation, such as a DC error calculation (Block 39).

The fine tuning may be performed by averaging the derivative of the phase of the signal over time, and the resulting number has a liner relationship with the frequency offset. The DSP 20' reads the result and increments the RF receiver 12' by 0.5 MHz for every 2,000 units of frequency offset found, if the frequency offset is positive, and by −0.5 MHz for every 2,000 units of frequency offset found, if the frequency offset is negative. The DSP 20' then locks the RF receiver 12' to the current frequency after fine tuning (Block 40), and the process ends (Block 41).

It should be noted that the current frequency may have changed during the fine tuning, based upon the frequency offset calculation. As will be appreciated by those of skill in the art, a video signal broadcast at a given frequency may be detected on a range of frequencies including the given frequency, although best reception will occur on the given frequency itself. Therefore, the FPGA 18' may detect a video signal on the current frequency, but the current frequency may not provide for the best reception of the video signal. The frequency offset calculation may be used to find the frequency for best reception of the video signal, and the current frequency at which the RF receiver 12' is scanning may be adjusted accordingly. The frequency offset calculation is typically able to pinpoint the frequency for best reception of an analog video signal if it is within a 4 MHz window of the current signal, while it is typically able to pinpoint the frequency for best reception of a digital video signal if it is within a 1 MHz window of the current signal.

Furthermore, the DSP 20' switches off the unsuccessful logic path in favor of the successful logic path. That is, if the DSP 20' receives a successful digital video decoding from the FPGA 18', it will switch off the analog video decoding logic path. The decoded digital video may then be stored or displayed by a storage device or display, respectively.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
   a radio frequency (RF) receiver being scannable over a plurality of different frequencies;
   an analog to digital (AD) converter coupled to said RF receiver and configured to generate a receive bitstream; and
   a processor coupled to said RF receiver and said AD converter and perform in parallel
   calculating a received power level from the receive bitstream,
   attempting analog video decoding from the receive bitstream, and
   attempting digital video decoding from the receive bitstream;
   said processor also lock said RF receiver to a current frequency or scan said RF receiver to a next frequency based upon the received power level, and the attempted analog and video decoding.

2. The communications device of claim 1 wherein said processor scans said RF receiver to the next frequency based upon the received power level being below a threshold.

3. The communications device of claim 1 wherein said processor scans said RF receiver to the next frequency based upon the received power level being above a threshold, and based upon a failure of attempted analog and digital video decoding.

4. The communications device of claim 1 wherein said processor locks said RF receiver to a current frequency based upon the received power level being above a threshold, and based upon a success of one of attempted analog and digital video decoding.

5. The communications device of claim 1 wherein said processor is also configured to perform a frequency offset calculation, and perform a fine tuning of said RF receiver based upon the Frequency offset calculation.

6. The communications device of claim 1 wherein said processor comprises a field programmable gate array (FPGA) and a digital signal processor (DSP) coupled thereto.

7. The communications device of claim 6 wherein said FPGA is configured to perform, in parallel, the calculation of the received power level, the attempted analog video decoding, and the attempted digital video decoding; and wherein said DSP is configured to lock said RF receiver to the current frequency or scan said RF receiver to the next frequency.

8. The communications device of claim 1, wherein the analog video decoding comprises a frequency modulated National Television System Committee (FM NTSC) decoding.

9. The communications device of claim 1, wherein the digital video decoding comprises a frequency-shift keying (FSK) video decoding.

10. The communications device of claim 1 further comprising a multiband antenna coupled to said RF receiver.

11. A communications device comprising:
    a radio frequency (RF) receiver being scannable over a plurality of different frequencies;
    an analog to digital (AD) converter coupled to said RF receiver and configured to generate a receive bitstream; and
    a processor coupled to said RF receiver and said AD converter and perform in parallel
    calculating a received power level from the receive bitstream,
    attempting analog video decoding from the receive bitstream, and
    attempting digital video decoding from the receive bitstream,
    said processor also lock said RF receiver to a current frequency based upon the received power level being above the threshold, and based upon a success of one of attempted analog and digital video decoding.

12. The communications system of claim 11 wherein said processor is also configured to scan said RF receiver to a next frequency based upon the received power level being above the threshold, and based upon a failure of attempted analog and video decoding.

13. The communications system of claim 11 wherein said processor is also configured to scan said RF receiver to a next frequency based upon the received power level being below a threshold.

14. The communications device of claim 11 wherein said processor is also configured to perform a frequency offset calculation and perform a fine tuning of said RF receiver based upon the Frequency offset calculation.

15. A method of operating a communications device comprising:
   generating a receive bitstream using an analog to digital (AD) converter coupled to a radio frequency (RF) receiver;
   performing in parallel, using a processor coupled to the AD converter and the RF receiver,
      a calculation of a received power level from the receive bitstream,
      an attempted analog video decoding of the receive bitstream, and
      an attempted digital video decoding of the receive bitstream; and
   locking the RF receiver to a current frequency or scanning the RF receiver to a next frequency based upon the received power level, and the attempted analog and video decoding, using the processor.

16. The method of claim 15 wherein the RF receiver is scanned to a next frequency based upon the received power level being below a threshold.

17. The method of claim 15 wherein the RF receiver is scanned to a next frequency based upon the received power level being above a threshold, and based upon a failure of attempted analog and digital video decoding.

18. The method of claim 15 wherein the RF receiver is locked to a current frequency based upon the received power level being above a threshold, and based upon a success of one of attempted analog and digital video decoding.

19. The method of claim 15 wherein further comprising performing a frequency offset calculation, and performing a fine tuning of the RF receiver based upon the Frequency offset calculation, using the processor.

20. The method of claim 15 wherein the analog video decoding comprises a frequency modulated National Television System Committee (FM NTSC) decoding; and wherein the digital video decoding comprises a frequency-shift keying (FSK) video decoding.

* * * * *